US012414220B2

(12) United States Patent
Saito et al.

(10) Patent No.: US 12,414,220 B2
(45) Date of Patent: Sep. 9, 2025

(54) HIGH-FREQUENCY ACCELERATION CAVITY CORE AND HIGH-FREQUENCY ACCELERATION CAVITY IN WHICH SAME IS USED

(71) Applicants: KABUSHIKI KAISHA TOSHIBA, Tokyo (JP); TOSHIBA MATERIALS CO., LTD., Yokohama (JP)

(72) Inventors: Tadao Saito, Yokohama Kanagawa (JP); Satoru Habu, Yokohama Kanagawa (JP)

(73) Assignees: KABUSHIKI KAISHA TOSHIBA, Tokyo (JP); TOSHIBA MATERIALS CO., LTD., Yokohama (JP)

( * ) Notice: Subject to any disclaimer, the term of this patent is extended or adjusted under 35 U.S.C. 154(b) by 546 days.

(21) Appl. No.: 17/669,636

(22) Filed: Feb. 11, 2022

(65) Prior Publication Data

US 2022/0210903 A1 Jun. 30, 2022

Related U.S. Application Data

(63) Continuation of application No. PCT/JP2020/035608, filed on Sep. 18, 2020.

(30) Foreign Application Priority Data

Oct. 11, 2019 (JP) ................................ 2019-187936

(51) Int. Cl.
*H05H 7/04* (2006.01)
*C22C 38/00* (2006.01)
(Continued)

(52) U.S. Cl.
CPC ............ *H05H 7/04* (2013.01); *C22C 38/002* (2013.01); *C22C 38/02* (2013.01); *C22C 38/12* (2013.01);
(Continued)

(58) Field of Classification Search
CPC ....... C22C 38/002; C22C 38/02; C22C 38/12; C22C 38/16; H01F 1/15308;
(Continued)

(56) References Cited

U.S. PATENT DOCUMENTS 5,072,205 A * 12/1991 Arakawa .................. H01F 3/04 336/219
5,486,404 A 1/1996 Nakajima et al.
(Continued)

FOREIGN PATENT DOCUMENTS

CN 109791831 A 5/2019
EP 0 625 786 A2 11/1994
(Continued)

OTHER PUBLICATIONS

"It Succeeds in the Super High-Performance Magnetic Body Core Mass Production for the Accelerator in J-PARC ~From a Damage Large Strength for Becoming~" J-PARC Center, Aug. 3, 2011, 10 pages https://www2.kek.jp/ja/news/press/2011/080315/.
(Continued)

*Primary Examiner* — Nicholas A Wang
(74) *Attorney, Agent, or Firm* — Foley & Lardner LLP

(57) ABSTRACT

A high-frequency acceleration cavity core is a toroidal core obtained by winding an Fe-based magnetic ribbon having crystals with an average crystal grain size of 1 μm or less, in which a space factor of the Fe-based magnetic ribbon is 40% or more and 59% or less, and a μQf value at 1 MHz is $3\times10^9$ Hz or more. The average crystal grain size is preferably 0.1 μm or less. The toroidal core preferably has a portion having a gap portion from an inner diameter to an outer diameter.

14 Claims, 3 Drawing Sheets

(51) Int. Cl.

| | |
|---|---|
| ***C22C 38/02*** | (2006.01) |
| ***C22C 38/12*** | (2006.01) |
| ***C22C 38/16*** | (2006.01) |
| ***H01F 1/153*** | (2006.01) |
| ***H01F 41/02*** | (2006.01) |

(52) U.S. Cl.
CPC ......... *C22C 38/16* (2013.01); *H01F 1/15308* (2013.01); *H01F 1/15333* (2013.01); *H01F 1/15341* (2013.01); *H01F 41/0226* (2013.01)

(58) Field of Classification Search
CPC ............. H01F 1/15333; H01F 1/15341; H01F 1/15383; H01F 3/04; H01F 41/0226
See application file for complete search history.

(56) References Cited

U.S. PATENT DOCUMENTS

| | | | | |
|---|---|---|---|---|
| 6,246,172 | B1 * | 6/2001 | Bizen | H01F 1/15333 336/213 |
| 2013/0314198 | A1 * | 11/2013 | Yoshizawa | H01F 3/04 148/306 |

FOREIGN PATENT DOCUMENTS

| | | | | |
|---|---|---|---|---|
| JP | S48-022319 | Y1 | | 3/1973 |
| JP | H03-074097 | A | | 3/1991 |
| JP | H03-114207 | A | | 5/1991 |
| JP | H03114207 | | * | 5/1991 |
| JP | H04-058309 | A | | 2/1992 |
| JP | H06-333717 | A | | 12/1994 |
| JP | H08-172000 | A | | 7/1996 |
| JP | 2562463 | B | | 12/1996 |
| JP | H09-007799 | A | | 1/1997 |
| JP | H10-125500 | A | | 5/1998 |
| JP | H10-275699 | A | | 10/1998 |
| JP | 2856130 | B | | 2/1999 |
| JP | H11-185999 | A | | 7/1999 |
| JP | 2000-138099 | A | | 5/2000 |
| JP | 2000-348899 | A | | 12/2000 |
| JP | 2001-089833 | A | | 4/2001 |
| JP | 2002-373811 | A | | 12/2002 |
| JP | 2004-134681 | A | | 4/2004 |
| JP | 2004-247191 | A | | 9/2004 |
| JP | 2005-158793 | A | | 6/2005 |
| WO | WO0072334 | | * | 11/2000 |

OTHER PUBLICATIONS

"It contributes to the technological advance of Japanese and European accelerators—Metal magnetic bodies to use in J-PARC, CERN are produced.", Japan Proton Accelerator Research Complex, Nov. 28, 2017, 8 pages https://j-parc.jp/ja/highlight/2017/highlights-j1701.html.

Saito, et al. FINEMET-core loaded untuned RF cavity, Nuclear Instruments and Methods in Physics Research A, Jul. 25, 1997, 402, pp. 1-13.

Yoshizawa, et al., "New Fe-based soft magnetic alloys composed of ultrafine grain structure", J. Appl. Phys., Nov. 1988, vol. 64, No. 10, pp. 6044-6046.

Sugiura, et al., "Improvement of Co-Based Amorphous Core for Untuned Broadband RF Cavity", Proceedings of EPAC 2006, Jul. 2006, TUPCH124, T06, pp. 1304-1306.

Chinese Office Action for CN Appl. Ser. No. 202080058381.2 dated Jun. 18, 2024 (13 pages).

China Power Press, "Compilation of Electric Power Industry Standards," Volume of Thermal Power, vol. 2, Boilers and Coal-fired Machinery, Edited by: Standardization Department of China Electricity Council, 1996 (pp. 1-8).

CN Office Action for the corresponding CN Application No. 202080058381.2 mailed on Dec. 23, 2024 (pp. 1-14).

Bin, C.Z.C., "Compilation of Typical Structure Design of Plastic Extruder Head and Mold Testing and Machine Debugging Experience," Edited by Chen Zecheng Chen Bin, Mechanical Industry Press, Apr. 30, 2014, (pp. 92-93).

CN Office Action in the corresponding Chinese Appl. Ser. No. 202080058381.2 mailed on Apr. 16, 2025 (17 pages).

* cited by examiner

HIGH-FREQUENCY ACCELERATION CAVITY CORE AND HIGH-FREQUENCY ACCELERATION CAVITY IN WHICH SAME IS USED

CROSS-REFERENCE TO RELATED APPLICATIONS

This application is a national stage application of International Application No. PCT/JP2020/035608, filed Sep. 18, 2020, which designates the United States, incorporated herein by reference, and which claims the benefit of priority from Japanese Patent Application No. 2019-187936, filed Oct. 11, 2019, the entire contents of which are incorporated herein by reference.

FIELD

Embodiments generally relate to a high-frequency acceleration cavity core and a high-frequency acceleration cavity in which the same is used.

BACKGROUND

An accelerator is a device that accelerates charged particles to generate a particle beam having high kinetic energy. As one type of accelerator, there is a high-frequency acceleration cavity. The high-frequency acceleration cavity is a device that efficiently accelerates charged particles using a high-frequency electric field. The high-frequency acceleration cavities are used in various fields such as industrial and medical. Examples of the high-frequency acceleration cavity include a cyclotron type, a waveguide type, and a synchrotron type. The cyclotron type is a type in which a high-output electron tube and a high-frequency acceleration cavity perform self-oscillation. The waveguide type is a type in which the high-frequency acceleration cavity is as long as 100 m or more. The synchrotron type has a function of changing a frequency of a high frequency in an acceleration process.

In the high-frequency acceleration cavity, a magnetic core is used to generate a high-frequency electric field. In order to efficiently accelerate charged particles, it is necessary to keep an acceleration distance by arranging a plurality of magnetic cores. In order to stabilize the acceleration, it is also necessary to stabilize the acceleration of the gap between the magnetic cores. For this purpose, it is effective to set the acceleration gap voltage to a high voltage.

As a conventional high-frequency acceleration cavity core, a ferrite core has been used. In general, the relative permeability of a magnetic core gradually increases with an increase in temperature, and rapidly decreases near the Curie temperature. When a high voltage is applied, heat generation of the ferrite core is large, and thus it is necessary to increase the size of a cooling facility. In addition, saturation of magnetic flux associated with the heat generation easily occurs. In addition, since the initial permeability μ is small, it is difficult to stably obtain a high acceleration gap voltage in a low frequency region of several 100 kHz.

Instead of this, a magnetic core using an Fe-based magnetic alloy having a fine crystal structure has been studied. JP 2000-138099 A discloses a high-frequency acceleration cavity magnetic core obtained by winding an Fe-based magnetic ribbon having a fine crystal structure with an average particle size of 100 nm or less. The magnetic core using the Fe-based magnetic ribbon having a fine crystal structure is able to suppress heat generation as compared with the ferrite core. In addition, since the initial permeability μ is large, the characteristics in the low-frequency region are improved. However, further improvement of the characteristics has not been achieved.

The space factor of the magnetic core of the above Patent Literature is set to 60% to 80%. The space factor is the occupancy of the magnetic material in the magnetic core, and is represented by a volume fraction (%) or an area ratio (%). The Fe-based magnetic alloy having a fine crystal structure is produced by heat-treating an Fe-based amorphous alloy. The Fe-based magnetic alloy having a fine crystal structure is a brittle material. Therefore, the Fe-based amorphous alloy is wound in a toroidal shape and then heat-treated to impart a fine crystal structure. The magnetic ribbon is shrunk when the fine crystal structure is imparted by the heat treatment. The magnetic ribbon is distorted with contraction, and corrugated wrinkles are generated in the wound structure. It has been found that this wrinkle causes stress deterioration.

DETAILED DESCRIPTION

A high-frequency acceleration cavity core according to an embodiment is a toroidal core obtained by winding an Fe-based magnetic ribbon having crystals with an average crystal grain size of 1 μm or less, in which a space factor of the Fe-based magnetic ribbon is 40% or more and 59% or less, and a μQf value at 1 MHz is $3\times10^9$ Hz or more.

Figure 1:
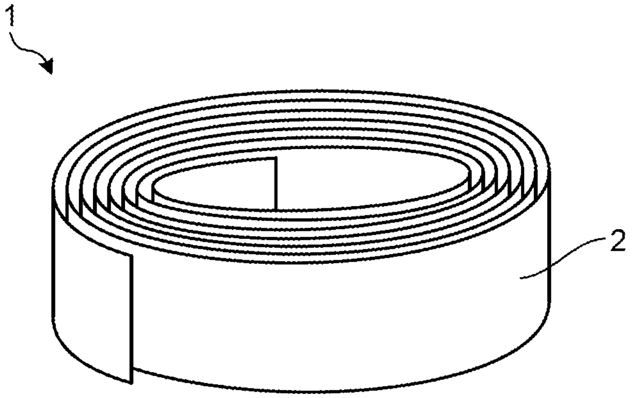
FIG. 1 is an external view illustrating an example of a high-frequency acceleration cavity core according to an embodiment.
Figure 2:
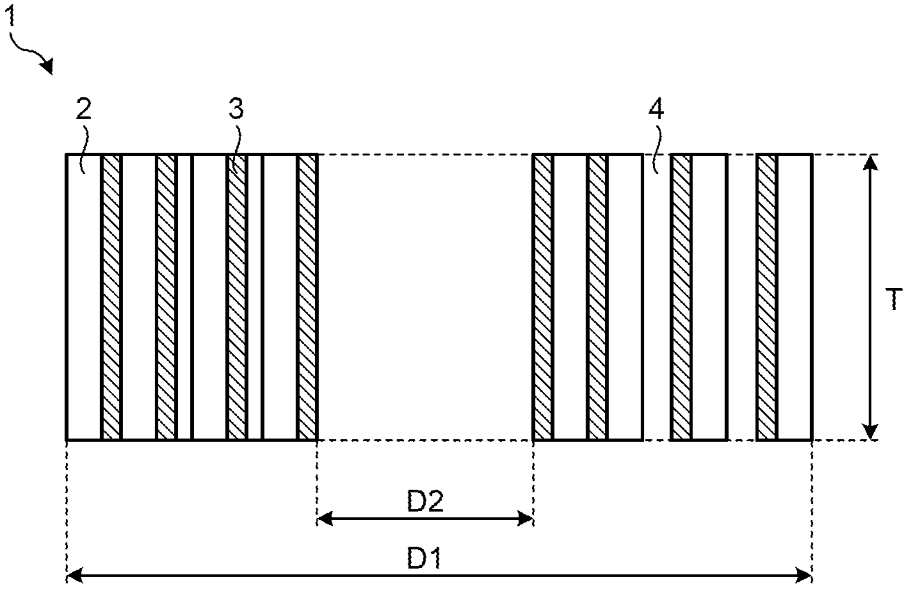
FIG. 2 is a cross-sectional view illustrating an example of the high-frequency acceleration cavity core according to the embodiment.

FIG. 1 is an external view illustrating an example of the high-frequency acceleration cavity core according to the embodiment. FIG. 2 is a cross-sectional view illustrating an example of the high-frequency acceleration cavity core according to the embodiment. In the drawings, the reference numeral 1 denotes a high-frequency acceleration cavity core, the reference numeral 2 denotes an Fe-based magnetic ribbon, the reference numeral 3 denotes an insulating layer, and the reference numeral 4 denotes a gap portion. D1 is an outer diameter of the core, D2 is an inner diameter of the core, and T is a width of the core. The high-frequency acceleration cavity core 1 may be simply referred to as a core 1.

The high-frequency acceleration cavity core 1 is a toroidal core around which the Fe-based magnetic ribbon 2 is wound.

The Fe-based magnetic ribbon 2 is made of an Fe-based magnetic alloy. The Fe-based magnetic alloy refers to an Fe alloy containing Fe (iron) most in atomic ratio (at %) among constituent elements.

The Fe-based magnetic alloy preferably satisfies the following general formula.

General Formula: $Fe_aCu_bM_cM'_dM''_eSi_fB_g$

In the formula, M is at least one element selected from a group consisting of Group 4 elements, Group 5 elements, Group 6 elements, and rare earth elements in the periodic table, M' is at least one element selected from a group consisting of Mn, Al, and platinum group elements, M" is at least one element selected from a group consisting of Co and Ni, a is a number satisfying a+b+c+d+e+f+g=100 atom %, b is a number satisfying $0.01 \leq b \leq 8$ atom %, c is a number satisfying $0.01 \leq c \leq 10$ atom %, d is a number satisfying $0 \leq d \leq 10$, e is a number satisfying $0 \leq e \leq 20$ atom %, f is a number satisfying $10 \leq f \leq 25$ atom %, and g is a number satisfying $3 \leq g \leq 12$ atom %.

Cu enhances corrosion resistance, prevents coarsening of crystal grains, and is effective for improving soft magnetic characteristics such as iron loss and magnetic permeability. The content of Cu is preferably 0.01 atom % or more and 8 atom % or less ($0.01 \leq b \leq 8$). When the content is less than 0.01 atom %, the effect of addition is small, and when the content exceeds 8 atom %, the magnetic characteristics are deteriorated.

M is at least one element selected from a group consisting of Group 4 elements, Group 5 elements, Group 6 elements, and rare earth elements in the periodic table. Examples of the Group 4 elements include titanium (Ti), zirconium (Zr), and hafnium (Hf). Examples of the Group 5 elements include vanadium (V), niobium (Nb), and tantalum (Ta). Examples of the Group 6 elements include chromium (Cr), molybdenum (Mo), and tungsten (W). Examples of the rare earth elements include yttrium (Y), a lanthanoid element, and an actinoid element. The element M is effective for uniformizing the crystal grain size and stabilizing the magnetic characteristics against temperature change. The content of the element M is preferably 0.01 atom % or more and 10 atom % or less ($0.01 \leq c \leq 10$). The periodic table is shown in the periodic table of Japan.

M' is at least one element selected from a group consisting of manganese (Mn), aluminum (Al), and a platinum group element. Examples of the platinum group elements include ruthenium (Ru), rhodium (Rh), palladium (Pd), osmium (Os), iridium (Ir), and platinum (Pt). The M' element is effective for improving soft magnetic characteristics such as saturation magnetic flux density. The content of the M' element is preferably 0 atom % or more and 10 atom % or less ($0 \leq d \leq 10$).

The M" element is at least one element selected from a group consisting of cobalt (Co) and nickel (Ni). The M" element is effective for improving soft magnetic characteristics such as saturation magnetic flux density. The content of the M" element is preferably 0 atom % or more and 20 atom % or less ($0 \leq e \leq 20$).

Silicon (Si) and boron (B) assist amorphization of the alloy or precipitation of microcrystals at the time of production. Si and B are effective for improvement of crystallization temperature and heat treatment for improvement of magnetic characteristics. In particular, Si is solid-solved in Fe which is a main component of fine crystal grains, and is effective for reducing magnetostriction and magnetic anisotropy. The content of Si is preferably 10 atom % or more and 25 atom % or less ($10 \leq f \leq 25$). The content of B is preferably 3 atom % or more and 12 atom % or less ($3 \leq g \leq 12$).

Among the M elements, Nb is most preferable. Therefore, the Fe-based magnetic alloy preferably contains Nb, Cu, Si, and B.

The average crystal grain size is 1 μm or less. If the average crystal grain size is larger than 1 soft magnetic characteristics are deteriorated. Therefore, the average crystal grain size is preferably 1 μm or less, and more preferably 0.1 μm or less. The average crystal grain size is more preferably 0.05 μm (50 nm) or less.

The average crystal grain size is determined by the Scherrer equation from the half width of the diffraction peak determined by X-ray diffraction (XRD) analysis. The Scherrer equation is expressed by $D=(K \cdot \lambda)/(\beta \cos \theta)$. Here, D is an average crystal grain size, K is a shape factor, λ is a wavelength of an X-ray, β is a full width at half maximum (FWHM) of a peak, and θ is a Bragg angle. The shape factor K is 0.9. The Bragg angle is half the diffraction angle 2θ. The XRD analysis is performed under the conditions of a Cu target, a tube voltage of 40 kV, a tube current of 40 mA, and a slit width (RS) of 0.20 mm. The X-ray irradiation direction is perpendicular to the longitudinal direction of the magnetic ribbon. The crystal peak is analyzed by changing the X-ray irradiation angle (2θ=5° to 140°).

In the high-frequency acceleration cavity core 1 according to the embodiment, the space factor of the Fe-based magnetic ribbon 2 is 40% or more and 59% or less. The space factor is an occupancy of the magnetic material in the magnetic core, and is represented by, for example, a volume fraction (%).

First, the volume of the core 1 is obtained. The volume of the core 1 is obtained by the equation, the volume of the core 1=[(outer diameter $D1/2)^2 \times 3.14$−(inner diameter $D2/2)^2 \times 3.14$]×the width T of the magnetic ribbon 2. The volume obtained by this calculation is referred to as a reference volume of the core 1.

Next, the density of the magnetic ribbon 2 is measured. The density of the magnetic ribbon 2 is either a measured value according to the Archimedes method or a theoretical value obtained from the composition. When the measurement sample is small, it may be difficult to perform detection by the Archimedes method. When the measurement sample is small, it is preferable to use a theoretical value obtained from the composition.

The reference mass of the core 1 can be obtained by the expression, the reference volume of the core 1×the density of the magnetic ribbon 2=the reference mass of the core 1. The reference mass of the core 1 is a theoretical mass when the space factor of the magnetic ribbon 2 is 100%.

Next, the mass of the core 1 is measured. This value is defined as a measured mass of the core 1.

A space factor (%) of the magnetic ribbon 2 can be obtained by the expression, the space factor (%) of the magnetic ribbon 2=(measured mass/theoretical mass)×100. This method is a method that does not consider the mass of the insulating layer. When a thin insulating layer as described later is used, there is no problem with this method.

The occupancy of the magnetic material in the magnetic core may be expressed by an area ratio (%) as follows.

In this case, the space factor is measured using an arbitrary cross section of the core. As the cross section, a cross section perpendicular to the width direction of the core (the width direction of the Fe-based magnetic ribbon 2) is used. An enlarged photograph of the cross section is taken. The magnification of the enlarged photograph is 50 times. For the cross section, a scanning electron microscope (SEM) is used.

For the space factor, (outer diameter D1−inner diameter D2)×width T of magnetic ribbon 2 is used as a reference area (100%). The space factor is determined by the area ratio (%) of the Fe-based magnetic ribbon 2 present in the reference area. The outer diameter D1 is a diameter at the outermost layer of the magnetic ribbon, and the inner diameter D2 is a diameter at the innermost layer of the magnetic ribbon. Therefore, the bobbin and the storage case are not included in the reference area.

As described above, the calculation of the space factor using the cross-sectional image is useful, for example, in a case where the size of the core 1 is large and it is difficult to calculate the space factor by the volume fraction (%). In both the case of using the volume fraction (%) and the case of using the area ratio (%) for calculation, the occupancy of the magnetic material in the magnetic core is substantially the same value.

When the space factor is 40% or more and 59% or less, it is possible to suppress the occurrence of corrugated wrinkles when heat treatment for imparting a fine crystal structure is performed. When the space factor is less than 40%, the ratio of the magnetic ribbon is reduced, and thus the magnetic characteristics are deteriorated. When the space factor exceeds 59%, there is a high possibility that corrugated wrinkles occur. Therefore, the space factor is preferably 40% or more and 59% or less, and more preferably 45% or more and 55% or less.

In the high-frequency acceleration cavity core 1 as described above, the μQf value at 1 MHz is $3\times10^9$ Hz or more.

The μQf value is calculated using a measured impedance value (Rs value, Xs value). The Rs value is a pure resistance, and the Xs value is a value of a reactance portion. f is a measurement frequency (Hz), μ0 is a vacuum permeability ($1.26\times10^{-6}$ N/A$^2$), μ is an initial permeability, D1 is an outer diameter of the core, D2 is an inner diameter of the core, T is a width of the core, and ln is an average magnetic path length.

$$Ms''=RS/[f\times\mu0\times T\times\ln(D1/D2)]$$

$$\mu s'=Xs/[f\times\mu0\times T\times\ln(D1/D2)]$$

$$Q=\mu s'/\mu s''$$

$$\mu=\mu s'\times[1+(1/Q^2)]$$

$$\mu Qf=\mu\times Q\times f$$

The μQf value at 1 MHz is a μQf value when the frequency f is 1 MHz. The μQf value at 1 MHz of $3\times10^9$ Hz or more indicates that the high-frequency acceleration cavity core is excellent in impedance characteristics. In a wide frequency range of 100 kHz to 10 MHz, impedance matching between the high-frequency power source and the high-frequency acceleration cavity core can be performed. As a result, the high-frequency power can be stably supplied, and the acceleration gap voltage can be increased. In particular, it is possible to increase the voltage in a low frequency range of 100 kHz to 1000 kHz.

The impedance is measured using an impedance measuring device. The impedance measuring device is 4285A manufactured by Hewlett-Packard Company. The measured impedance values Rs and Xs at 0.5 V and 1 turn are measured at frequencies of 0.5 MHz, 1 MHz, 5 MHz, and 10 MHz to calculate the μQf value.

The thickness of the Fe-based magnetic ribbon 2 is preferably 10 μm or more and 30 μm or less. When the thickness of the magnetic ribbon 2 is less than 10 μm, the strength of the magnetic ribbon may be reduced. Reduction in strength leads to reduction in yield. When the thickness of the magnetic ribbon 2 exceeds 30 μm, the loss increases and the calorific value may increase. Therefore, the thickness of the magnetic ribbon 2 is preferably 10 μm or more and 30 μm or less, and more preferably 15 μm or more and 25 μm or less.

Figure 5:
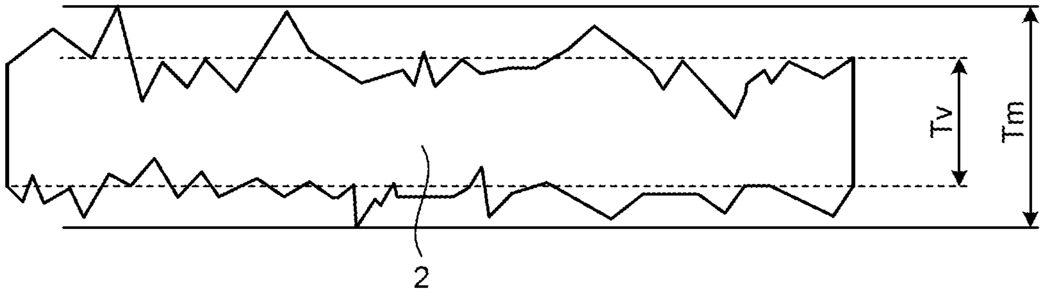
FIG. 5 is a conceptual diagram illustrating an average plate thickness of a magnetic ribbon.

As the thickness of the magnetic ribbon 2, an average thickness Tv calculated from the mass and the density is used. FIG. 5 is a conceptual diagram illustrating an average plate thickness of the magnetic ribbon.

The thickness of the magnetic ribbon 2 is measured using an enlarged photograph of a cross section of the core 1. The thickness of an arbitrary portion of the magnetic ribbon 2 shown in the enlarged photograph is measured. This operation is performed at five locations, and the average value is defined as the thickness of the magnetic ribbon 2. An enlarged photograph having a magnification of 2000 times is used.

The thickness (plate thickness) of the magnetic ribbon is expressed by the average plate thickness Tv illustrated in FIG. 5. As illustrated in FIG. 5, the magnetic ribbon has irregularities on the surface. For this reason, even if the ribbons are overlapped with each other, an air layer exists, and the space factor does not become 100%.

It is preferable that at least one of the surfaces of the Fe-based magnetic ribbon includes an insulating layer having a thickness within a range of 5% or more and 20% or less of the plate thickness of the magnetic ribbon. The insulating layer 3 is preferably provided on the surface of the magnetic ribbon 2. By providing the insulating layer 3, interlayer insulation can be achieved.

The thickness of the insulating layer 3 is preferably in a range of 5% or more and 25% or less of the plate thickness of the magnetic ribbon 2. For example, when the thickness of the magnetic ribbon 2 is 20 μm, the thickness of the insulating layer 3 is 1 μm or more and 5 or less. When the thickness of the insulating layer 3 is less than 5%, there is a possibility that a portion where the insulating layer 3 is too thin and interlayer insulation is insufficient is formed. When the thickness of the insulating layer 3 exceeds 25%, it is difficult to adjust the space factor as well as to obtain no more insulating effect. Therefore, the thickness of the insulating layer 3 is preferably 5% or more and 25% or less, and more preferably 8% or more and 20% or less of the thickness of the magnetic ribbon 2.

For the thickness of the insulating layer 3, an enlarged photograph of the cross section of the core 1 is used. The thickness of an arbitrary portion of the insulating layer 3 shown in the enlarged photograph is measured. This operation is performed at five locations, and the average value is defined as the thickness of the insulating layer 3. As similar to the above, an enlarged photograph having a magnification of 2000 times is used.

Examples of the material of the insulating layer 3 include insulating fine particles and insulating resin. The insulating layer 3 is preferably an insulating film formed by depositing insulating fine particles having an average particle size of 0.001 μm or more (1 nm or more). The deposition of the insulating fine particles facilitates control of the thickness of the insulating layer 3.

The insulating fine particles are preferably oxides, and examples of the insulating fine particles include oxides such as silicon oxide ($SiO_2$), magnesium oxide (MgO), and aluminum oxide ($Al_2O_3$), and resin powders. It is particularly preferable to use silicon oxide ($SiO_2$). Since the oxide does not contract during drying, the generation of stress can be suppressed. In particular, since silicon oxide is well compatible with the Fe-based magnetic ribbon 2, variations in magnetic permeability can be reduced. This is effective when silicon oxide and the Fe-based magnetic ribbon 2 contain silicon as an essential constituent element. The average particle size of the insulating fine particles is preferably 0.001 μm or more and 0.1 μm or less. With this range, it is easy to control the thickness of the insulating layer 3.

The toroidal core preferably has a portion having a gap portion from an inner diameter to an outer diameter. The gap portion 4 is a space formed between the wound magnetic ribbons 2. When the space between the magnetic ribbons 2 is filled with the insulating layer 3, it is not the gap portion 4. When the insulating layer 3 is provided on one surface of the magnetic ribbon 2, the gap portion 4 is formed between the magnetic ribbon 2 and the insulating layer 3. When the insulating layers 3 are provided on both surfaces of the magnetic ribbon 2, the gap portion 4 is formed between the insulating layers 3. The gap portion 4 may be continuously present in the width T direction of the core, or may be partially in contact in the core. The presence of the gap portion 4 makes it possible to suppress the formation of a corrugated portion 5 even when the magnetic ribbon 2 contracts when the core 1 is heat-treated. The presence or absence of the gap portion 4 can be checked by an optical microscope. The presence of the gap portion 4 is determined when a gap of 10 μm or more can be recognized with an optical microscope. When the core 1 is too large to be observed with an optical microscope, the gap portion 4 may be observed by enlarging an image captured with a microscope, a digital camera, or the like. When the corrugated portion 5 to be described later is formed, a method of observing the vicinity of the corrugated portion 5 is efficient. The presence or absence of the gap portion 4 may be obtained by calculation. When the result of the expression 100%−(space factor+volume of insulating layer) has a positive value, it indicates that the gap portion 4 is present.

Figure 3:
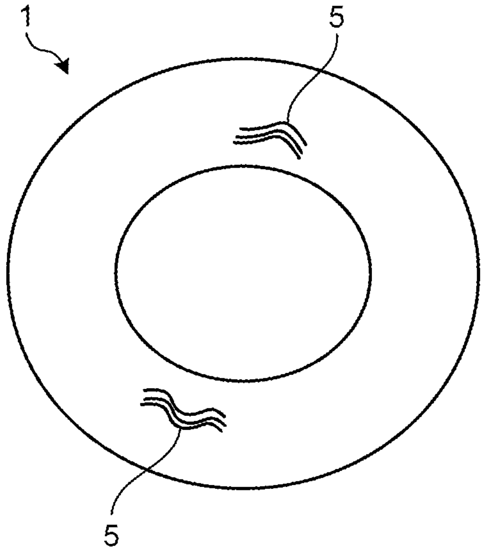
FIG. 3 is a diagram illustrating an example of a corrugated portion.

FIG. 3 illustrates an example of the corrugated portion. In the drawing, the reference numeral 2 denotes a magnetic ribbon, and the reference numeral 5 denotes a corrugated portion. The corrugated portion 5 is a portion having a corrugated wrinkle shape without having a clean toroidal shape. When the corrugated portion 5 is present, stress deterioration occurs. The Fe-based magnetic ribbon having a fine crystal structure is a brittle material. For this reason, it is preferable that the Fe-based amorphous ribbon is wound around the toroidal core and then heat-treated to precipitate fine crystals. When fine crystals are precipitated, the magnetic ribbon 2 contracts. By providing the gap portion 4, it is possible to suppress formation of the corrugated portion 5 accompanying contraction. The presence or absence of the corrugated portion 5 can be visually checked.

The space factor of the gap portion 4 of the core 1 on which the insulating layer 3 is formed is preferably 5% or more and 40% or less. The space factor of the gap portion 4 may be obtained by calculation as described above. That is, the space factor of the gap portion 4 can be calculated by the above equation, 100%−(space factor+volume of insulating layer).

Alternatively, the space factor of the gap portion 4 is measured using a cross-sectional photograph in the same manner as in the measurement of the space factor of the magnetic ribbon 2. The space factor of the gap portion 4 is preferably 5% or more and 40% or less, and more preferably 10% or more and 30% or less. By providing the gap portion 4 within this range, even if the corrugated portion 5 is formed, the width can be 5 mm or less (including 0). The size of the corrugated portion 5 is measured by measuring a deviation from the toroidal shape. When the corrugated portion 5 is present, a portion in which the magnetic ribbon 2 is distorted is formed. The radial length of the core 1 in the distorted portion is defined as the size of the corrugated portion 5. One in which the corrugated portion 5 is not formed has no distorted portion and has a clean toroidal shape. The corrugated portion 5 is either convex inward in the radial direction or convex outward in the radial direction. There is also a structure in which irregularities are repeated.

When the corrugated portion 5 is 5 mm or less, stress deterioration can be suppressed. The number of corrugated portions 5 having a size of 5 mm or less is preferably 5 or less in one core 1. Even in the case of the corrugated portion 5 having a size of 5 mm or less, a large number of the corrugated portions 5 causes stress deterioration. The size of the corrugated portion 5 is preferably as small as 5 mm or less, and more preferably 3 mm or less. Most preferably, the corrugated portion 5 is not formed.

The outer diameter D1 of the toroidal core is preferably 280 mm or more. In order to improve acceleration performance in a high-frequency acceleration cavity, it is necessary to keep an acceleration distance by arranging a plurality of cores. In order to increase the acceleration gap voltages of the plurality of cores, it is effective to increase the size of the core 1. By adjusting the space factor of the magnetic ribbon 2, the formation of the corrugated portion 5 can be suppressed even if the outer diameter D1 of the core 1 increases to 280 mm or more. The upper limit of the outer diameter D1 of the core 1 is not particularly limited, but is preferably 1000 mm or less. If it exceeds 1000 mm, it may be difficult to control the space factor of the magnetic ribbon and the space factor of the gap portion due to the core weight.

In the core 1 according to the embodiment, for example, when the difference between the outer diameter D1 and the inner diameter D2 is 50 mm or more, the action and effect thereof are more remarkably exhibited. When D1−D2≥50 mm, it means that the number of turns of the magnetic ribbon 2 is large, and corrugated wrinkles are likely to occur. By applying the core 1 according to the embodiment, the number of turns of the magnetic ribbon 2 can be increased, and for example, a core of D1−D2≥50 mm can be achieved. As described above, even when the difference between the outer diameter D1 and the inner diameter D2 is 50 mm or more, the core 1 according to the embodiment can maintain or improve the performance by controlling the space factor.

When the corrugated portion 5 is formed, the magnetic permeability decreases as the stress deteriorates. In order to prevent a decrease in magnetic permeability, it is effective to subject the core 1 to heat treatment in a magnetic field. However, when the core size increases, heat treatment equipment also needs to be increased in size accordingly. By controlling the space factor of the magnetic ribbon 2 as described above, suppressing the formation of the corrugated portion 5 eliminates the need for heat treatment equipment in a magnetic field. Therefore, the effect of cost reduction is also large.

The presence or absence of the heat treatment in the magnetic field can be determined by observing the magnetic domain structure. When the magnetic field treatment is performed in the width direction, the magnetic domains draw a uniform layer structure in the width direction. The determination can be made when the squareness ratio in the DC magnetic characteristics (applied magnetic field Hm=800 A/m) is 3% or less. Magnetic characteristics are improved by performing heat treatment in a magnetic field. On the other hand, in order to heat-treat a large core having an outer diameter D1 of 280 mm or more in a magnetic field, a large facility is required.

Since a large corrugated portion is formed in the conventional core, magnetic characteristics are improved by performing heat treatment in a magnetic field. Since the corrugated portion is suppressed, the core according to the embodiment has the same magnetic characteristics even if heat treatment in a magnetic field is not performed. In other words, by subjecting the core according to the embodiment to heat treatment in a magnetic field, the magnetic characteristics are further improved.

Since the core 1 according to the embodiment suppresses stress deterioration due to the corrugated portion 5, the permeability is large. Therefore, the core according to the embodiment can be downsized as long as it has the same magnetic characteristics as compared with the core having the corrugated portion 5. If the core size is the same, it is possible to provide one having excellent magnetic characteristics.

A bobbin may be used as necessary at the time of winding in a toroidal shape. The toroidal core may be placed in a storage case as necessary. The gap may not be provided in the core 1. Providing a gap makes it difficult to adjust the space factor of the gap portion 4.

The high-frequency acceleration cavity core as described above is suitable for a high-frequency acceleration cavity. It is preferable to include a plurality of the high-frequency acceleration cavity core according to the embodiment. It is preferable to include a device that supplies high-frequency power to each of the high-frequency acceleration cavity cores.

Figure 4:
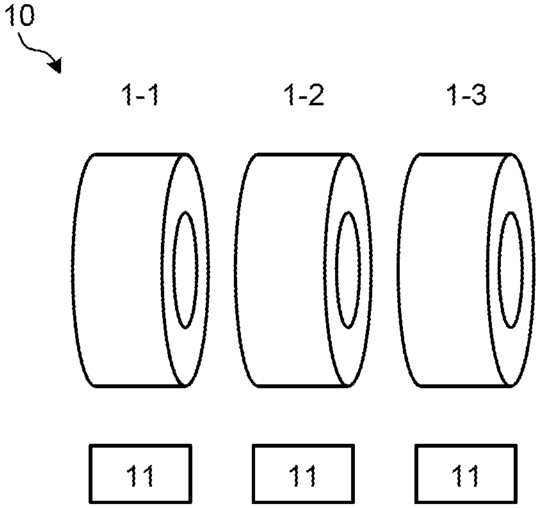
FIG. 4 is a conceptual diagram illustrating an example of a high-frequency acceleration cavity.

FIG. 4 is a conceptual diagram of the high-frequency acceleration cavity. In the drawing, the reference numeral 10 denotes a high-frequency acceleration cavity, the reference numeral 1-1 denotes a first high-frequency acceleration cavity core, the reference numeral 1-2 denotes a second high-frequency acceleration cavity core, the reference numeral 1-3 denotes a third high-frequency acceleration cavity core, and the reference numeral 11 denotes a power supply. Although FIG. 4 illustrates an example in which three high-frequency acceleration cavity cores are used, in the high-frequency acceleration cavity according to the embodiment, the number of high-frequency acceleration cavity cores can be increased as necessary. Some of the high-frequency acceleration cavities use 10 or more cores. The power supply 11 is connected to each core by wiring (not illustrated). The core 1 may be fixed to a mounting substrate or a heat sink (not illustrated) as necessary. An adhesive, screwing, or the like may be used for fixing to the mounting substrate or the heat sink. The core may be placed in a case as necessary. At this time, each of some numbers of cores may be placed in the cases. It is possible to improve the assemblability by setting some numbers of them as one set.

The high-frequency acceleration cavity is a device that efficiently accelerates charged particles using a high-frequency electric field. The frequency to be applied to each of the high-frequency acceleration cavity core 1 can also be adjusted by connecting the power supply 11 to each of the high-frequency acceleration cavity cores 1. In other words, in a case where it is not necessary to individually adjust the frequency, the power supply 11 may not be connected to each.

In the high-frequency acceleration cavity core according to the embodiment, the space factor of the toroidal core using the Fe-based magnetic ribbon is controlled. For this reason, stress deterioration is prevented while the calorific value is suppressed. Accordingly, in a wide frequency range of 100 kHz to 10 MHz, impedance matching between the high-frequency power source and the high-frequency acceleration cavity core can be performed. As a result, the high-frequency power can be stably supplied, and the acceleration gap voltage can be increased. In particular, it is possible to increase the voltage in a low frequency range of 100 kHz to 1000 kHz. Even if the frequency applied to each of the high-frequency acceleration cavity cores 1 is changed, the acceleration gap voltage can be increased.

Examples of the high-frequency acceleration cavity include a cyclotron type, a waveguide type, and a synchrotron type. Since the core can be used in a wide frequency range, the core can be applied to various types of high frequency acceleration cavities.

Next, a method for manufacturing the high-frequency acceleration cavity core according to the embodiment will be described. The method for manufacturing the high-frequency acceleration cavity core according to the embodiment is not particularly limited as long as the core has the above configuration, but the following method can be mentioned as a method for obtaining a high yield.

First, an Fe-based amorphous ribbon is manufactured. In the production of the Fe-based amorphous ribbon, a long ribbon is manufactured using a rapid cooling roll method. As the rapid cooling roll method, various methods such as a single roll method and a twin roll method can be applied. As the raw material of the Fe-based amorphous ribbon, it is preferable to use a raw material molten metal mixed at a ratio satisfying the above general formula. The thickness of the Fe-based amorphous ribbon is preferably in a range of 10 μm or more and 30 μm or less. When the width of the long Fe-based amorphous ribbon is larger than the intended width T of the core, slit processing is performed.

Next, a process of providing an insulating layer is performed as necessary. The insulating layer is preferably formed using, for example, insulating fine particles having an average particle diameter of 0.001 μm or more and 0.1 μm or less. A method of immersing the Fe-based amorphous ribbon in a solution containing insulating fine particles is preferable. The thickness of the insulating layer can be adjusted by the average particle diameter of the insulating fine particles, the concentration of the solution containing the insulating fine particles, the immersion time, and the number of times of immersion. By immersing the long Fe-based amorphous ribbon, mass productivity can be improved.

Examples of the material of the insulating layer 3 include insulating fine particles and insulating resin. The insulating fine particles are preferably oxides, and examples of the insulating fine particles include oxides such as silicon oxide ($SiO_2$), magnesium oxide (MgO), and aluminum oxide ($Al_2O_3$), and resin powders. It is particularly preferable to use silicon oxide ($SiO_2$). Since the oxide does not contract during drying, the generation of stress can be suppressed. In particular, since silicon oxide is well compatible with the Fe-based magnetic ribbon 2, variations in magnetic permeability can be reduced. This is effective when silicon oxide and the Fe-based magnetic ribbon 2 contain silicon as an essential constituent element.

Next, a process of winding in a toroidal shape is performed. In the winding process, a bobbin is preferably used as necessary. In particular, when the outer diameter D1 of the core 1 is increased to 280 mm or more, the winding is preferably performed using a bobbin. The bobbin is a ring-shaped winding core. The bobbin is preferably made of a nonmagnetic material. Examples of the nonmagnetic material include stainless steel (SUS 304 or the like).

In the winding process, the Fe-based amorphous ribbon is wound such that the space factor of the Fe-based amorphous ribbon falls within the range of 40% or more and 59% or less. The gap portion 4 can also be formed by adjusting the tension at the time of winding the long Fe-based amorphous ribbon. For adjusting the tension, a method of loosening the tension when the number of windings increases is effective. The winding tension is controlled by the voltage of the motor. Examples of the method include a method of, when the voltage at the initial stage of the winding process is set to 100, decreasing the voltage by 5 to 20. There is also a method of gradually lowering the voltage at the initial stage of the winding process. After winding, the outermost layer of the Fe-based amorphous ribbon is fixed. Through this process, a toroidal core around which an Fe-based amorphous ribbon is wound is manufactured.

Thereafter, a heat treatment process for imparting a fine crystal structure may be further performed. Even when the heat treatment process as below is performed, the space factor of the toroidal core before the heat treatment process is maintained substantially equal.

The heat treatment temperature is preferably a temperature near or higher than the crystallization temperature. A temperature higher than the crystallization temperature of −20° C. is preferable. In the case of the Fe-based magnetic ribbon 2 satisfying the general formula described above, the crystallization temperature is 500° C. or more and 515° C. or less. Therefore, the heat treatment temperature is preferably 480° C. or more and 600° C. or less. The temperature is more preferably 510° C. or more and 560° C. or less.

The heat treatment time is preferably 50 hours or less. The heat treatment time is a time when the temperature of the magnetic core is 480° C. or more and 600° C. or less. If it exceeds 50 hours, the average grain size of the fine crystal grains may exceed 1 μm. The heat treatment time is more preferably 20 minutes or more and 30 hours or less. With this range, it is easy to control the average crystal grain size to 0.1 μm or less.

Through the above processes, the high-frequency acceleration cavity core can be manufactured.

EXAMPLES

Example 1 to 8, Comparative Example 1 to 3, Reference Example 1

As the long Fe-based amorphous ribbon, an Fe—Nb—Cu—Si—B ribbon was prepared. The Fe—Nb—Cu—Si—B ribbon had a composition formula $Fe_{73}Nb_4Cu_1Si_{15}B_7$, a plate thickness of 20 and a width T of 30 mm.

A bobbin made of SUS304 was prepared. The bobbin had an outer diameter of 310 mm, an inner diameter of 280 mm, and a width of 30 mm. Silicon oxide ($SiO_2$) and magnesium oxide (MgO) were prepared as insulating fine particles for forming an insulating layer. The average particle diameter of the insulating fine particles was 0.01 μm. For providing an insulating layer, a process of immersing a long Fe-based amorphous ribbon in a solution containing insulating fine particles, and drying the long Fe-based amorphous ribbon was performed.

A long Fe-based amorphous ribbon was wound around a bobbin to produce a toroidal core having an outer diameter D1 of 440 mm and an inner diameter D2 of 310 mm. In the toroidal cores according to Examples and Comparative Examples, the corrugated portion was not formed before the heat treatment. In Comparative Example 3, a resin film having a thickness of 12 μm was used as the insulating layer. For the toroidal cores according to Examples, winding was performed while adjusting the tension in the winding step.

Next, the toroidal core was subjected to a heat treatment process at 550° C. for two hours in an argon atmosphere. Of the Fe-based magnetic toroidal core, the space factor, the presence or absence of the gap portion, the thickness of the insulating layer, and the size of the corrugated portion are as shown in Table 1. The space factor and the thickness are calculated from the material density obtained by observing the cross section of the core with an enlarged photograph (SEM photograph). The presence or absence of the gap portion was checked with a microscope. A sample in which a gap of 10 μm or more was observed was rated "Present".

The size of the corrugated portion was measured by measuring a deviation from the toroidal shape. The size of irregularities, when observed in the radial direction, out of a clear toroidal circle was measured. Example 8 is obtained by subjecting Example 2 to a heat treatment in a magnetic field, and various characteristics in Table 1 below are equivalent to those of Example 2.

TABLE 1

| | Insulating layer | | | | | |
|---|---|---|---|---|---|---|
| | Material | Thickness (μm) | Thickness ratio with respect to magnetic ribbon (%) | Space factor of magnetic ribbon (%) | Presence/absence of gap portion | Size of corrugated portion Size and number of irregularities |
| Example 1 | None | — | — | 58 | Present | Absent |
| Example 2 | $SiO_2$ | 1 | 5 | 51 | Present | Absent |
| Example 3 | $SiO_2$ | 2 | 10 | 45 | Present | Absent |
| Example 4 | MgO | 4 | 20 | 55 | Present | Absent |
| Example 5 | MgO | 5 | 25 | 45 | Present | Absent |
| Example 6 | $SiO_2$ | 2 | 10 | 44 | Present | 2 mm, One position |
| Example 7 | $SiO_2$ | 2 | 10 | 44 | Present | 4 mm, One position |
| Comparative example 1 | None | — | — | 82 | Absent | 8 mm, Entire circumference |
| Comparative example 2 | $SiO_2$ | 1 | 5 | 73 | Present | 6 mm, Two positions |
| Comparative example 3 | Resin film | 12 | 60 | 38 | Absent | Absent |

As shown in the table 1, in Comparative Example 1 and Comparative Example 2, a corrugated portion was formed when heat treatment for precipitating fine crystals was performed. No corrugated portion was formed in the cores according to Examples. It was confirmed that Examples and Comparative Examples had a fine crystal structure having an average crystal grain size of 0.1 μm or less.

Next, the μQf value of each core was measured. The μQf value was measured using an impedance measuring device. The impedance measuring device was 4285A manufactured by Hewlett-Packard Company. The measured impedance values Rs and Xs at 1 MHz, 0.5 V, and 1 turn were measured to calculate the μQf value. The calculation method is as described above. The impedance at the measurement frequencies of 0.5 MHz, 5 MHz, and 10 MHz was also measured by the same method.

The core of Comparative Example 2 subjected to heat treatment in a magnetic field was used as Reference Example 1. The same measurement was performed for Reference Example 1.

The squareness ratio of each core was measured. The squareness ratio was measured with the applied magnetic field Hm set to 800 A/m. The results are shown in Tables 2 and 3.

TABLE 2

| | μ Qf value ($\times 10^9$ Hz) | | | |
|---|---|---|---|---|
| | 0.5 MHz | 1 MHz | 5 MHz | 10 MHz |
| Example 1 | 3.26 | 3.58 | 4.00 | 4.58 |
| Example 2 | 3.39 | 3.72 | 4.17 | 4.76 |
| Example 3 | 2.89 | 3.32 | 3.74 | 4.31 |
| Example 4 | 2.66 | 3.02 | 3.41 | 3.91 |
| Example 5 | 2.83 | 3.22 | 4.03 | 4.93 |
| Example 6 | 2.90 | 3.26 | 3.66 | 4.29 |
| Example 7 | 2.88 | 3.20 | 3.58 | 4.17 |
| Example 8 | 4.93 | 5.66 | 8.96 | 9.25 |
| Comparative example 1 | 1.21 | 1.59 | 2.18 | 2.97 |
| Comparative example 2 | 1.56 | 2.05 | 2.56 | 3.21 |
| Comparative example 3 | 1.20 | 1.42 | 2.11 | 2.88 |
| Reference example 1 | 4.82 | 5.45 | 8.65 | 8.75 |

TABLE 3

| | Squareness ratio Br/Bm [%] |
|---|---|
| Example 1 | 74.5 |
| Example 2 | 69.1 |
| Example 3 | 70.4 |
| Example 4 | 71.1 |
| Example 5 | 70.6 |
| Example 6 | 70.3 |
| Example 7 | 71.8 |
| Example 8 | 2.5 |
| Comparative example 1 | 86.0 |
| Comparative example 2 | 82.6 |
| Comparative example 3 | 73.2 |
| Reference example 1 | 2.3 |

As described above, in the cores according to Examples, the μQf value at 1 MHz was $3\times10^9$ Hz or more. The μQf value at 0.5 MHz was $2.5\times10^9$ Hz or more. The μQf value at 5 MHz was $3.3\times10^9$ Hz or more. The μQf value at 10 MHz was $2.8\times10^9$ Hz or more. As described above, it was confirmed that the cores according to Examples have a high μQf value in a wide frequency range of 100 kHz to 10 MHz.

On the other hand, in Comparative Example 1 to 3, the μQf values were all low. When heat treatment in a magnetic field was performed as in Example 8 and Reference Example 1, μQf values higher than those in Examples were obtained. The core of Example 1 to 7 can also be used as a high-frequency acceleration cavity. Therefore, the core according to the embodiment does not need to be subjected to heat treatment in a magnetic field.

The sample subjected to the heat treatment in a magnetic field had a squareness ratio of 3% or less. Therefore, the presence or absence of the heat treatment in the magnetic field can be determined by examining the squareness ratio.

Examples 9 to 11

As the long Fe-based amorphous ribbon, an Fe—Nb—Cu—Si—B ribbon was prepared. The Fe—Nb—Cu—Si—B ribbon had a composition formula of $Fe_{73}Nb_4Cu_1Si_{15}B_7$, a plate thickness of 18 μm, and a width T of 20 mm. Cores with different outer diameters D1 and inner diameters D2 were prepared. The finished cores are as shown in Tables 4 and 5.

TABLE 4

| | Outer diameter D1 (mm) | Inner diameter D2 (mm) | Outer diameter − inner diameter |
|---|---|---|---|
| Example 9 | 240 | 150 | 90 |
| Example 10 | 310 | 200 | 110 |
| Example 11 | 555 | 310 | 245 |
| Example 12 | 700 | 310 | 390 |

TABLE 5

| | Insulating layer | | | | | |
|---|---|---|---|---|---|---|
| | Material | Thickness (μm) | Thickness ratio with respect to magnetic ribbon (%) | Space factor of magnetic ribbon (%) | Presence/absence of gap portion | Size of corrugated portion Size and number of irregularities |
| Example 9 | $SiO_2$ | 1 | 6 | 58 | Present | None |
| Example 10 | $SiO_2$ | 1 | 6 | 57 | Present | None |
| Example 11 | $SiO_2$ | 2 | 11 | 47 | Present | None |
| Example 12 | $SiO_2$ | 2 | 11 | 43 | Present | None |

Magnetic characteristics of the cores according to the respective Examples were measured in a similar manner to that in Example 1. The results are shown in Tables 6 and 7.

TABLE 6

| | μ Qf value (×$10^9$ Hz) | | | |
|---|---|---|---|---|
| | 0.5 MHz | 1 MHz | 5 MHz | 10 MHz |
| Example 9 | 3.19 | 3.42 | 3.97 | 4.51 |
| Example 10 | 3.56 | 3.76 | 4.27 | 4.96 |
| Example 11 | 3.31 | 3.43 | 4.03 | 4.77 |
| Example 12 | 2.98 | 3.15 | 3.48 | 3.99 |

TABLE 7

| | Squareness ratio Br/Bm [%] |
|---|---|
| Example 9 | 63.2 |
| Example 10 | 67.8 |
| Example 11 | 61.8 |
| Example 12 | 60.5 |

As can be seen from the table, the magnetic characteristics of the cores according to Examples were improved even when the sizes of the outer diameter and the inner diameter were changed. Even when the difference between the outer diameter D1 and the inner diameter D2 was 50 mm or more, the magnetic characteristics were improved. This is because the space factor and the like were controlled.

Although some embodiments of the present invention have been illustrated above, these embodiments have been presented as examples, and are not intended to limit the scope of the invention. These novel embodiments can be implemented in various other forms, and various omissions, substitutions, changes, and the like can be made without departing from the gist of the invention. These embodiments and modifications thereof are included in the scope and gist of the invention, and are included in the invention described in the claims and the equivalent scope thereof. The above-described embodiments can be implemented in combination with each other.

What is claimed is:

1. A core that is a toroidal core for an acceleration cavity applicable to a frequency of 100 kHz or more, obtained by winding an Fe-based magnetic ribbon having crystals with an average crystal grain size of 1 μm or less, wherein a space factor of the Fe-based magnetic ribbon is 40% or more and 59% or less and the toroidal core has a portion having a gap portion of 10 μm or more from an inner diameter to an outer diameter, the gap portion being sandwiched between a first portion of an inner diameter side of the Fe-based magnetic ribbon and a second portion of an outer diameter side of the Fe-based magnetic ribbon which is adjacent to the first portion, at least one of surfaces of the Fe-based magnetic ribbon includes an insulating layer having a thickness within a range of 5% or more and 25% or less of a thickness of the Fe-based magnetic ribbon, and a space factor of the gap portion is 5% or more and 40% or less.

2. The core according to claim 1, wherein a μQf value at 1 MHz is 3×$10^9$ Hz or more.

3. The core according to claim 1, wherein the average crystal grain size is 0.1 μm or less.

4. The core according to claim 1, wherein the space factor of the Fe-based magnetic ribbon is 45% or more and 55% or less.

5. The core according to claim 1, wherein the Fe-based magnetic ribbon contains Nb, Cu, Si, and B.

6. The core according to claim 1, wherein the thickness of the Fe-based magnetic ribbon is 10 μm or more and 30 μm or less.

7. The core according to claim 1, wherein in the Fe-based magnetic ribbon, the thickness is 10 μm or more and 30 μm or less, and the average crystal grain size is 0.1 μm or less.

8. The core according to claim 1, wherein an outer diameter of the toroidal core is 280 mm or more.

9. The core according to claim 1, wherein the Fe-based magnetic ribbon does not have a corrugated portion exceeding 5 mm in the toroidal core.

10. The core according to claim 1, wherein a μQf value at 1 MHz is 3×$10^9$ Hz or more, and an outer diameter of the toroidal core is 280 mm or more.

11. The core according to claim 1, wherein a μQf value at 1 MHz is 3×$10^9$ Hz or more, an outer diameter of the toroidal core is 280 mm or more, and the Fe-based magnetic ribbon does not have a corrugated portion exceeding 5 mm in the toroidal core.

12. An acceleration cavity applicable to a frequency of 100 kHz or more, comprising the high-frequency acceleration cavity core according to claim 1.

13. The acceleration cavity according to claim 12, comprising a plurality of the high-frequency acceleration cavity core.

14. The acceleration cavity according to claim 13, further comprising a device that supplies high-frequency power to each of the high-frequency acceleration cavity core.

* * * * *